US007805909B2

(12) United States Patent
Teng et al.

(10) Patent No.: US 7,805,909 B2
(45) Date of Patent: Oct. 5, 2010

(54) SHINGLE WITH LOW DENSITY GRANULES AND/OR BACKDUST

(76) Inventors: Yishien H. Teng, 6845 Spring Run Dr., Westerville, OH (US) 43082; Sanjay Mansukhani, 7747 Emmanuel Dr., Lewis Center, OH (US) 43035

( * ) Notice: Subject to any disclaimer, the term of this patent is extended or adjusted under 35 U.S.C. 154(b) by 0 days.

(21) Appl. No.: 12/420,873

(22) Filed: Apr. 9, 2009

(65) Prior Publication Data

US 2009/0249728 A1    Oct. 8, 2009

Related U.S. Application Data

(62) Division of application No. 11/582,285, filed on Oct. 17, 2006, now abandoned.

(51) Int. Cl.
*B05D 1/24* (2006.01)
*B05D 1/10* (2006.01)
*B05D 1/12* (2006.01)
*E04G 1/00* (2006.01)

(52) U.S. Cl. ............... 52/746.11; 428/141; 428/143; 428/144; 428/489; 428/323; 106/273.1; 106/281.1; 427/186; 427/201; 427/202; 427/203; 118/308

(58) Field of Classification Search ........... 52/518–532, 52/535–560, 745.05, 745.06, 745.08, 745.1, 52/756.11, 748.1, 746.11; 428/141, 489, 428/143–144, 323; 106/273.1, 282.1; 427/186–188, 427/201–203; 118/308, 310, 312
See application file for complete search history.

(56) References Cited

U.S. PATENT DOCUMENTS

| RE16,983 | E | * | 5/1928 | Robinson | 52/559 |
|---|---|---|---|---|---|
| 1,850,680 | A | | 3/1932 | Levi | |
| 2,045,423 | A | | 6/1936 | Topping | |
| 2,113,644 | A | | 4/1938 | Bollaert | |
| 2,196,267 | A | * | 4/1940 | Leonard, Jr. | 52/558 |
| 2,235,212 | A | | 3/1941 | Herscovitz | |
| 2,253,652 | A | | 8/1941 | Ritter | |
| 3,137,100 | A | * | 6/1964 | Harshberger | 428/54 |
| 3,202,743 | A | * | 8/1965 | Elmendorf | 264/109 |
| 3,252,257 | A | | 5/1966 | Price et al. | |
| 3,307,989 | A | * | 3/1967 | Harshberger | 156/71 |
| 3,369,956 | A | * | 2/1968 | Ericson et al. | 428/143 |
| 4,634,622 | A | * | 1/1987 | Jenkins et al. | 428/143 |
| 4,900,589 | A | | 2/1990 | Montgomery | |
| 5,052,162 | A | | 10/1991 | Bush et al. | |
| 5,284,509 | A | | 2/1994 | Kamel et al. | |
| 5,382,449 | A | | 1/1995 | Hedges | |
| 5,465,547 | A | | 11/1995 | Jakel | |
| 6,156,289 | A | | 12/2000 | Chopra et al. | |
| 6,524,682 | B1 | * | 2/2003 | Leavell | 428/143 |

(Continued)

OTHER PUBLICATIONS

US Office Action, U.S. Appl. No. 11/582,285 dated Aug. 21, 2008.

(Continued)

*Primary Examiner*—Jeanette Chapman
(74) *Attorney, Agent, or Firm*—MacMillan, Sobanski & Todd, LLC

(57) ABSTRACT

A roofing shingle has low density granules adhered to at least a headlap region on a front surface of the roof shingle.

17 Claims, 2 Drawing Sheets

U.S. PATENT DOCUMENTS

| | | |
|---|---|---|
| 6,610,147 B2 | 8/2003 | Aschenbeck |
| 6,696,125 B2 * | 2/2004 | Zanchetta et al. .......... 428/40.1 |
| 6,790,307 B2 | 9/2004 | Elliott |
| 7,052,635 B2 * | 5/2006 | Mischo ....................... 264/115 |
| 7,163,716 B2 * | 1/2007 | Aschenbeck ................ 427/202 |
| 2003/0068469 A1 | 4/2003 | Aschenbeck et al. |
| 2003/0198736 A1 | 10/2003 | Fensel |
| 2006/0075930 A1 | 4/2006 | Wang et al. |

OTHER PUBLICATIONS

US Office Action, U.S. Appl. No. 11/582,285 dated Jan. 7, 2009.

* cited by examiner

SHINGLE WITH LOW DENSITY GRANULES AND/OR BACKDUST

CROSS REFERENCE TO RELATED APPLICATIONS

The present application is a division of co-pending U.S. patent application Ser. No. 11/582,285, entitled SHINGLES WITH LOW DENSITY GRANULES AND/OR BACKDUCT, filed Oct. 17, 2006.

TECHNICAL FIELD AND INDUSTRIAL APPLICABILITY OF THE INVENTION

The present invention relates generally to asphalt-based roofing materials. The invention also relates to processes for making the roofing materials.

BACKGROUND OF THE INVENTION

Asphalt-based roofing materials, such as roofing shingles, roll roofing and built-up roofing, are installed on the roofs of buildings to provide protection from the elements. Typically, the roofing material is constructed of materials including a reinforcing mat such as a glass fiber mat, an asphalt-based coating which saturates the mat and coats the front and back and a layer of surfacing granules adhering to the top coating as well as a backdust material to cover the back coating. The asphalt-based coating usually contains a filler such as pulverized limestone.

The quantity, composition and properties of the raw materials used to make a roofing material determine, to a great extent, the performance of the resultant roofing material (e.g., weathering durability, cracking, blistering, algae resistance, pliability, sticking, and impact resistance). They also determine the cost to produce the roofing material, and its weight. For a roofing shingle, the cost to produce the shingle is usually about 60-80% materials cost.

Traditionally, the roofing material weight has been linked to its quality and durability, perceived as a primary indicator for the amount of asphalt used and for the product performance. However, the product weight can be misleading, since the asphalt contributes to only a small part of the total weight. For a given amount of asphalt in a roofing material, its product weight depends largely on the quantities and densities of other raw materials like filler, granules, and backdust material used, which fill up the volume or cover the surface of the roofing material. These raw materials can be selected from many kinds of mineral or waste materials in different densities, which meet the requirements for the manufacture of quality roofing materials. When the raw material density changes, the roofing material weight will vary, but its performance may not be necessarily impacted. When purchased by weight and used for volume filling or surface covering, the densities of the raw materials can become a leverage for balancing product weight and cost.

In the trend of rising energy costs, an unnecessarily heavier product may result in a higher transportation cost without benefits to the product performance. Moreover, a heavier roofing product increases the labor intensity and risk of ergonomic injuries during handling and application.

One weight-increasing material that typically does not add to the useful properties of the installed shingle is the backdust material. Roofing shingles usually have a backdust material on the bottom coating to prevent them from sticking together in a bundle or from sticking together in a roll. The backdust is typically made from rock, which may be crushed as in talc, carbonate or rock dust. The backdust may also be produced by screening sediment, such as silica sand.

In view of the current roofing materials, there is obviously a need for roofing materials that are optimized as a whole for performance, material and transportation costs and application convenience. There is also a need for a process for making such roofing materials.

The invention will be more readily understood from the following description of a preferred embodiment thereof given, by way of example, with reference to the accompanying drawings.

SUMMARY OF THE INVENTION

A roof covering has a front surface with a headlap region and a prime region. Low density granules are applied on the headlap region surface. Colored granules of low density may also be applied to the prime region surface. In certain embodiments, the low density granules have a specific gravity between about 0.7 to about 2.3, or an apparent density between about 20 lbs/c.f. and about 70 lbs/c.f. The low density granules are lightweight or porous that can be natural, processed or recycled materials, such as one or more of expanded perlite, expanded shale, expanded clay, expanded slate, pumice, coal slags, metal slags, agglomerated flyash, or other agglomerates. Similar materials of low density may also be used as backdust.

A method of manufacturing a roof covering includes coating a substrate with an organic-based coating material and applying low density granules on a headlap region and/or prime region of the coated substrate, as well as on the backside of the roofing material. When the densities of headlap and prime granules are different, an algorithm for sheet weight control will calculate the weights of prime and headlap regions separately and use the prime region weight as a primary parameter for product weight control.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings.

DETAILED DESCRIPTION AND PREFERRED EMBODIMENTS OF THE INVENTION

Figure 1:
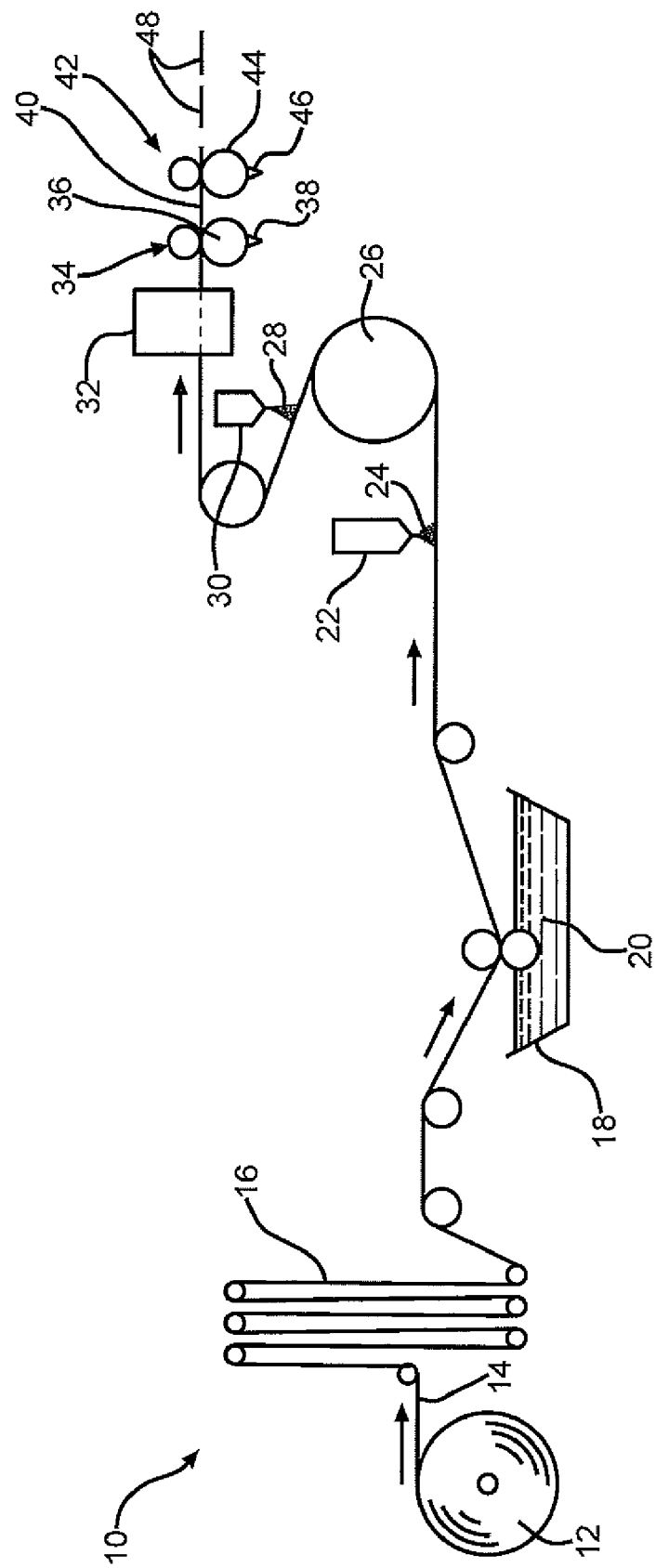
FIG. 1 is a schematic elevational view of an apparatus for manufacturing roofing shingles having a low density granule headlap region.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. The terms "top", "bottom", "front", "back", "side", and the like are used herein for the purpose of explanation only. It will be understood that when an element such as a layer, region, or panel is referred to as being "on" another element, it can be directly on the other element or intervening elements may be present. If an element or layer is described as being "adjacent to" or "against" another element or layer, it is to be appreciated that that element or layer may be directly adjacent to or directly against that other element or layer, or intervening elements may be present. It will also be understood that when an element such as a layer or element is referred to as being "over" another element, it can be directly over the other element, or intervening elements may be present.

Figure 2:
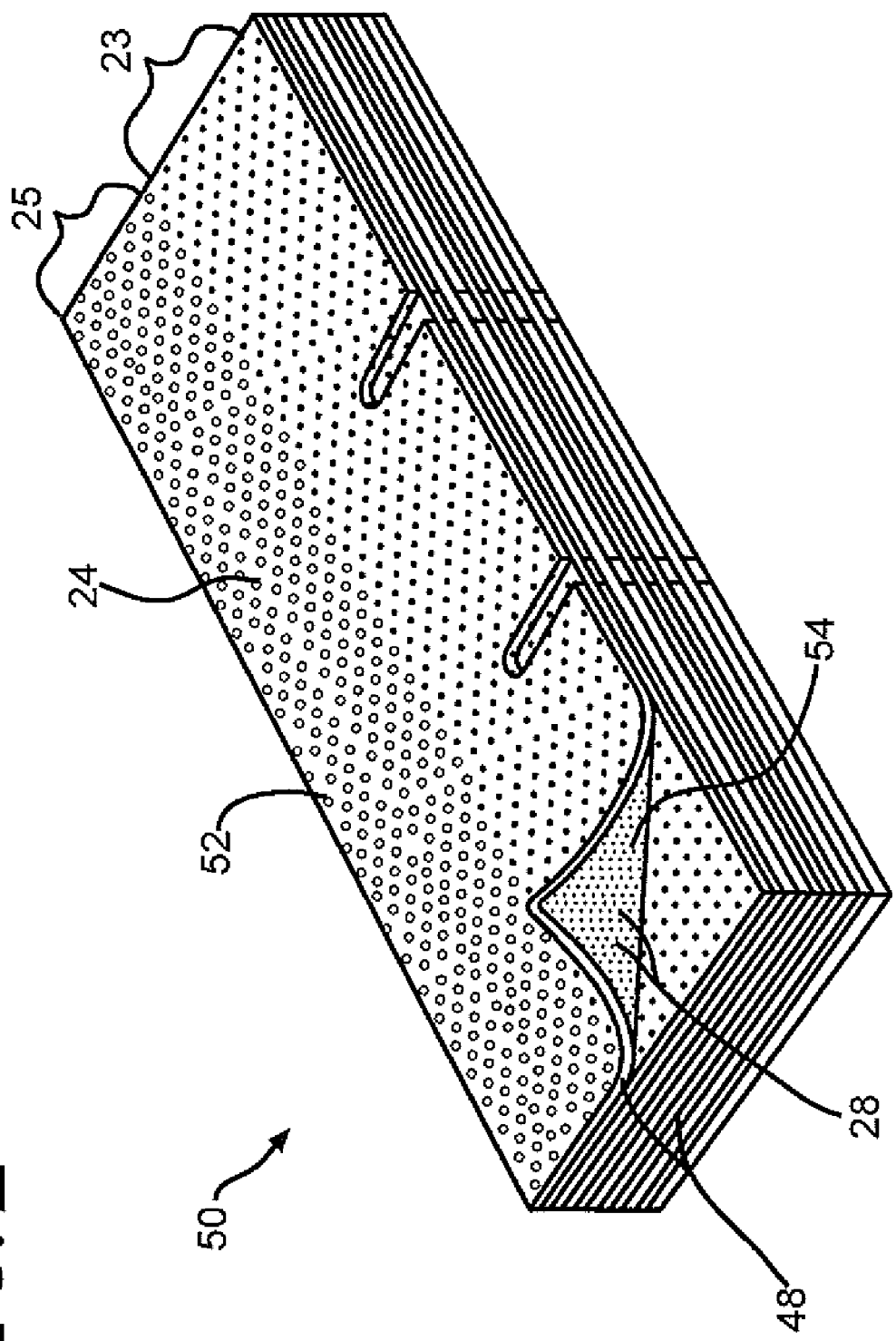
FIG. 2 is a perspective view of a bundle of roofing shingles having a low density granules headlap region and a low density particle backdust applied to the back surface of the shingles.

Referring now to the drawings, there is shown in FIG. 1 an example of apparatus 10 for manufacturing roofing shingles having low density headlap granules, and in certain embodiments, low density granular backdust. Although the description herein will be illustrated in relation to three-tab roofing shingles (as illustrated in FIG. 2), it is to be understood that the invention is also applicable to other types of roof coverings, such as laminated roofing shingles, roll roofing, or built-up roofing.

Initially, a substrate is payed out from a roll 12 as a continuous sheet 14. The substrate can be any type of material known for use in reinforcing roofing shingles, such as a web, scrim or felt of fibrous materials such as mineral fibers, cellulose fibers, rag fibers, mixtures of mineral and synthetic fibers, or the like. Preferably, the substrate is a nonwoven web of glass fibers.

The sheet 14 is passed from the roll through an accumulator 16. The accumulator allows time for splicing one roll of mat to another, during which time the mat within the accumulator is fed to the manufacturing process so that the splicing does not interrupt manufacturing.

Next, the sheet 14 is passed through a coater 18 where an organic-based coating material 20 is applied to the sheet 14. The coating material 20 can be applied in any suitable manner. In the illustrated embodiment, the sheet 14 is coated with a supply of hot, molten coating material 20 to completely cover the sheet 14 with the tacky coating material 20. However, in other embodiments, the coating material 20 can be sprayed on, rolled on, or applied to the sheet 14 by other means.

The term "organic-based coating material" means a coating material containing a substantial quantity of an organic material such as a bituminous material and/or a polymeric material. Any type of bituminous material suitable for coating roof coverings can be used, such as asphalt, tar, pitch, or a mixture thereof. The asphalt can be either a manufactured asphalt produced by refining petroleum or by other methods, or a naturally occurring asphalt. The coating material can also include various additives and/or modifiers, such as inorganic fillers or mineral stabilizers. In a typical asphalt roofing shingle, the coating material includes asphalt and a filler of finely ground inorganic particulate matter, such as pulverized limestone, in an amount within a range of from about 40% to about 80% by weight of the coating material.

In certain embodiments, the filler can comprise low density granules, as further defined herein.

The hot coated sheet 14 is passed beneath a series of granule applicators 22 that discharge protective roofing granules 21, 24 onto the top surface of the sheet 14. One preferred granule applicator is a granule valve of the type disclosed in U.S. Pat. No. 6,610,147 to Aschenbeck, which is incorporated herein by reference in its entirety.

As schematically illustrated in FIG. 2, the roofing granules 21, 24 comprise at least two types: i) prime roofing granules 21 that are applied to the prime area 23 portion of the shingle that will be exposed on the roof and, ii) headlap roofing granules 24, applied in the headlap area 25, preferably of low density, that are applied to the portion of the shingle that will be normally substantially covered on the roof.

The prime granules 21 generally provide the shingle with its desired performance characteristics (including aesthetics, coloring and weathering), while the headlap granules 25 generally keep adjacent shingles from sticking together and provide similar performance characteristics where exposed (for example between the tabs of a strip shingle). Preferred headlap granules 25 are of low density, which will be described in more detail below. However, the prime granules 21 may also be made of low density materials that have a specific gravity less than 2.3 or an apparent density less than 70 lbs/c.f.

The granule coated sheet is passed around a drum 26 that presses the roofing granules 21, 24 into the hot, tacky coating material and inverts the sheet sufficiently for any non-adhering roofing granules to fall into a hopper (not shown) for recycling. While the sheet is inverted, a backdust 28 is applied to the back surface 54 of the sheet. The backdust 28 is supplied from a backdust applicator 30. In a preferred embodiment, the backdust 28 can comprise low density granules, as will be described in more detail below.

Next, the sheet is passed through a cooling section 32 in which the coating material is cooled, Any suitable type of cooling section can be used. In a typical cooling section, the sheet is passed up and down between a number of rolls and sprayed with water and/or exposed to cooling air to cool the coating material.

The sheet is fed through a pattern cutter 34, a preferred example of which comprises a rotary cutter which includes a cutting cylinder 36 having a cutting knife 38 or blade. The pattern cutter cuts the sheet into multiple continuous strips 40 of shingles (one of which is shown), and cuts a series of cutouts and notches in each of the strips. Next, each of the strips 40 is fed through a length cutter 42 which includes a cutting cylinder 44 having a cutting knife 46. The length cutter cuts the strip into roofing shingles 48. Finally, the roofing shingles are stacked in a bundle 50 and packaged using suitable equipment (not shown).

FIG. 2 illustrates a bundle 50 of the roofing shingles 48. As schematically illustrated in FIG. 2, the roofing granules 21, 24 include the prime granules 23 and the headlap granules 25. The prime granules 23 are adhered in a prime region on the front surface 52 of the roofing shingle 48 (the surface exposed when the shingle is installed on a roof). The prime granules 21 generally comprise mineral particulate matter that is produced, for example, from raw mineral ores. The prime granules 21 are generally characterized by bulk densities in the range of between 80 and 120 lbs/ft$^3$, unless lightweight prime granules are used. Furthermore, the specific gravity of the non-lightweight prime granules 21 is generally at least 2.5, and generally ranges between 2.55 and 3.05, and the hardness of the prime granules generally is at least about a Moh hardness of 7 or higher.

Referring again to FIG. 2, the low density headlap granules 24 are adhered in a headlap region 25 on the front surface 52 of the roofing shingle 48 (the surface that is covered by adjacent shingles when installed on a roof).

It has now been found that low density granules 24 can advantageously be used as a headlap material on roof coverings. In a preferred embodiment, the low density headlap granules 24 are suitable for use in a roof covering manufacturing process in direct substitution for existing headlap materials. This saves the expense of headlap material without need for modifying the equipment and/or process to accommodate the new headlap material.

In certain embodiments, the algorithm for sheet weight control is modified to recognize the different weights between the prime and headlap regions. Traditionally, a weight gauge scans across the sheet of roofing material and collects the weight information from both prime and headlap regions without differentiation.

In one embodiment, the algorithm analyzes the data and gives instructions for adjusting the gap between two exit rolls of the coater and hence the thickness of the coated material if necessary. For example, when the densities of prime and headlap granules are different, the algorithm collects sheet weight data from the prime and headlap regions separately. To guarantee the roofing material meets certain specifications, the weight of the prime region needs to be maintained at a desired constant specification. Therefore, the prime region weight may be selected as a primary parameter in the algorithm for control of roofing material weight, and the headlap region weight may be controlled in a different manner or ignored for that purpose. In addition to controlling the sheet weight by controlling the thickness of the coated material, the sheet weight can also be controlled by controlling the temperature of the coated material thereby controlling the amount of granules adhering to the coated material. The sheet weight can further be controlled by controlling the amount of granules deposited on the coated material.

The low density headlap granules 24 are generally not visible when used on the shingle, and therefore the low density granules may not have to meet any aesthetic or weathering requirements. The presence of some contaminants in the low density headlap granules is acceptable, so long as the contaminants are not harmful to the roof covering manufacturing process or incompatible with the asphalt, or problematic if exposed between the tabs of the prime area 23.

However, for strip shingles that have cut-outs 27 between tabs 29, the color of the headlap granules 24 of an underlying shingle is visible through the narrow gaps of an overlying shingle. If the headlap color is different from a desired color, a preferred lightweight headlap granules is painted to the desired color, or colored patterns can be produced with colored granules, which synchronize with the cut-outs of strip shingles to show the desired color through the gaps.

A preferred low density headlap granule 25 can be classified by size where the low density granules which are large in size (e.g., retained on a 30 mesh screen [0.59 mm openings]) can be applied as headlap roofing granules on the roofing shingles.

The headlap granules typically contribute about 30-40 pounds of weight for each square of conventional roofing shingles. One advantage of the low density headlap granules 25 is that the low density granules add less weight to the shingles, without reducing the desired properties of the shingle. The reduction in weight also reduces transportation costs, and benefits the workers who lift and install shingles on roofs.

In certain embodiments, the low density granules have specific gravity of about 2.3 or less, and in certain embodiments, in a range between about 1.2 and 1.7, and a bulk density within a range between about 30 lb/ft$^3$ and about 70 lb/ft$^3$. By contrast, conventional prime granules generally have a bulk density of about 80 lb/ft$^3$ and above. In certain embodiments, the granules which are large in size (e.g., retained on a 30 mesh screen [0.59 mm openings]) are applied as roofing granules on the roofing shingles. In certain embodiments, the low density headlap granules 25 can have an average diameter between about 0.1 mm (# 120 mesh) and about 2 mm (#7 mesh). Also, in certain embodiments, the low density headlap granules can have a diameter within a range between about 0.2 mm (#70 mesh) and about 1.5 mm (#16 mesh).

In certain embodiments, the low density headlap granules 25 include one or more of expanded perlite, expanded shale, expanded clay, expanded slate, pumice, glass microspheres, crumb rubber, polymeric particles or other lightweight low density materials. Also, in certain embodiments, the low density headlap granules 25 provide higher thermal resistance than conventional headlap granules.

The low density headlap granules 25 have good flowability, such that they are substantially free-flowing when subjected to pressure or gravity. The good flowability allows the low density granules to function well as a headlap material, and to be easily incorporated into a roof covering manufacturing process.

Another advantage of the low density granules 25 is that the low density granules have lower abrasive qualities than previously used types of headlap granules, which may improve the cuttability of roofing materials, extend the life of knife blades, and reduce the labor intensity of roofing workers. In certain embodiments, the lower abrasiveness is due to the relative "softness" (that is, the lower hardness of such low density materials as perlite and pumice [Mohs hardness of 5.5] compared to conventional (i.e., high density) materials such as silica [Mohs hardness of 7]). Advantageously, the lower abrasive qualities of the low density headlap granules reduce wear on the cutting knives used to cut the roofing shingles compared to the amount of wear on the same cutting knives when the shingles have the same amount of harder granules. Another advantage is that certain low density granules have a generally rounded to subangular shape which provides good handleability, such that the low density granules can be handled with the bare hands without substantial injury to the hands.

In another aspect, the low density headlap shingles can further include low density backdust materials 28 in order to further decrease the weight of the shingles. In such embodiments, the low density particles 28 are applied as a backdust on a back surface 54 of the roofing shingle 48 (the surface facing the roof when the shingle is installed on the roof). The low density backdust 28 prevents the roofing shingles 48 from sticking together in the bundle 50 while reducing the overall weight of the shingles.

In such embodiments, the low density backdust materials 28 can have any particle size suitable for use as a backdust material on a roof covering. Typically, the low density backdust materials 28 can have a particle size similar to fine-grained silica sand. In certain embodiments, the low density backdust materials 28 can have an average diameter between about 0.04 mm and about 1.0 mm. In certain embodiments, the low density backdust materials 28 are medium in size (e.g., pass through a 30 mesh screen [0.59 mm openings] but retained on a 325 mesh screen [0.044 mm openings]).

As noted above, in certain embodiments, some or all of the prime granules 21 may be made of similar materials, and coated to provide the desired coloration and weathering properties. However, because shingle weight typically takes into consideration the prime area, it may be less desirable in certain situation to reduce the weight of the prime granules and thus the prime area of the shingle. Where this is not a concern, a lightweight shingle may include one or more of the lightweight headlap, prime and backdust granules.

In a further alternative embodiment, the asphalt filler material is substituted with a lightweight filler material. This may be done selectively, for example only in the headlap area, or throughout the shingle coating. Likewise the lightweight filler may be incorporated only in the back coating, only in the top coating of the shingle, or both. In yet a further embodiment, a lightweight filler is pre-applied to the roofing mat prior to coating the mat with asphalt (filled or unfilled) in the headlap, prime area, or both. In yet another embodiment, lightweight granules are applied between the layers of a laminated shingle to increase the thickness of the shingle without increasing weight. This may be done by applying the granules between the sheet, on the bottom of the top layer or the top of the bottom layer. In a preferred embodiment, large lightweight backdust is applied to the upper sheet.

The principle and mode of operation of this invention have been described in its preferred embodiments. However, it should be noted that this invention may be practiced otherwise than as specifically illustrated and described without departing from its scope.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed herein contemplated for carrying out this invention, but that the invention will include all embodiments falling within the scope of the claims.

What is claimed is:

1. A method of manufacturing a roofing shingle comprising:
    coating a substrate with an organic-based coating material, the coated substrate having a front surface with a headlap region and a prime region;
    applying a first portion of low density granules to the headlap region;
    applying a second portion of low density granules to the prime region, wherein the density of the granules of the first portion are different from the density of the granules of the second portion;
    determining the weight of the prime region independent of determining the weight of the headlap region subsequent to the application of the first and second portions of low density granules; and
    controlling the weight of the shingle in response to the weight of the prime region.

2. The method of claim 1, wherein the low density granules of the first portion have a bulk density within a range between about 30 lb/ft$^3$ and about 70 lb/ft$^3$ and the low density granules of the second portion have a bulk density of about 80 lb/ft$^3$ and above.

3. The method of claim 1, wherein the low density granules of the first portion have a specific gravity in a range between about 1.2 and 1.7.

4. The method of claim 1, wherein the low density granules of the first portion comprise one or more of expanded perlite, expanded shale, expanded clay, expanded slate, pumice, glass microshperes, crumb rubber, polymeric particles, and combinations thereof.

5. The method of claim 1, wherein the low density granules applied to the roofing shingle causes a reduction in the wear of a cutting knife used to cut the roofing shingle when compared with the wear of a knife used to cut a conventional shingle.

6. A method of manufacturing a roofing shingle comprising:
    coating a substrate with an organic-based coating material, the coated substrate having a front surface with a headlap region and a prime region;
    applying a first portion of low density granules to the headlap region;
    applying a second portion of low density granules to the prime region, wherein the density of the granules of the first portion are different from the density of the granules of the second portion;
    calculating the weight of the prime region independent of calculating the weight of the headlap region subsequent to the application of the first and second portions of low density granules; and
    controlling the thickness of the coating on the substrate in response to the weight of the prime region.

7. The method of claim 6 wherein the low density granules of the first portion comprise one or more of expanded perlite, expanded shale, expanded clay, expanded slate, pumice, glass microspheres, crumb rubber, polymeric particles, and combinations thereof.

8. The method of claim 1, including controlling the weight of the shingle by adjusting the temperature of the coating material, thereby allowing more or less granules to adhere to the coating material.

9. The method of claim 1, including controlling the weight of the shingle by changing the amount of the granules applied to the shingle.

10. The method of claim 6, wherein the low density granules of the first portion have a bulk density within a range between about 30 lb/ft$^3$ and about 70 lb/ft$^3$ and the low density granules of the second portion have a bulk density of about 80 lb/ft$^3$ and above.

11. The method of claim 6, wherein the low density granules of the first portion have a specific gravity in a range between about 1.2 and 1.7.

12. The method of claim 6, including controlling the weight of the shingle by adjusting the temperature of the coating material, thereby allowing more or less granules to adhere to the coating material.

13. The method of claim 6, including controlling the weight of the shingle by changing the amount of the granules applied to the shingle.

14. A method of manufacturing a roofing shingle comprising:
    coating a substrate with an organic-based coating material, the coated substrate having a front surface with a headlap region and a prime region;
    applying a first portion of low density granules to the headlap region;
wherein the first portion of low density granules has a specific gravity between about 1.2 to about 1.7;
    applying a second portion of low density granules to the prime region, wherein the second portion of low density granules has a specific gravity of at least about 2.5;

calculating the weight of the prime region independent of calculating the weight of the headlap region subsequent to the application of the first and second portions of low density granules, and controlling the thickness of the coating on the substrate in response to the weight of the prime region.

15. The method of claim 14, wherein the low density granules of the first portion comprise one or more of expanded perlite, expanded shale, expanded clay, expanded slate, pumice, glass microspheres, crumb rubber, polymeric particles, and combinations thereof.

16. The method of claim 14, including controlling the weight of the shingle by adjusting the temperature of the coating material, thereby allowing more or less granules to adhere to the coating material.

17. The method of claim 14, including controlling the weight of the shingle by changing the amount of the granules applied to the shingle.

* * * * *